July 24, 1962
P. PUGLIESE
3,045,383
CATCH-ALL FISH NET
Filed March 20, 1961
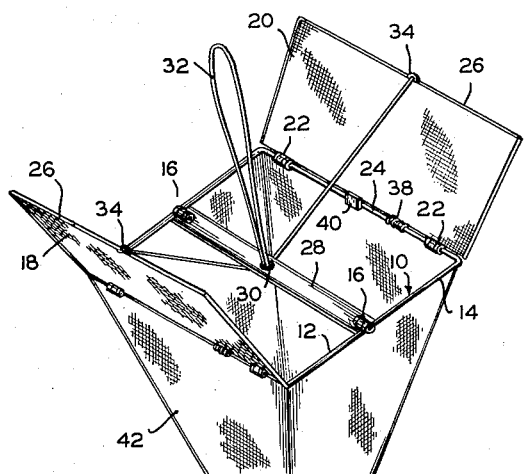
FIG. 1
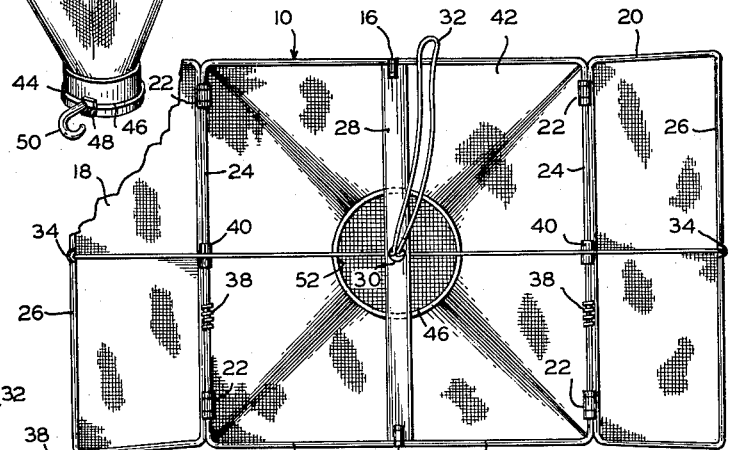
FIG. 2
FIG. 3
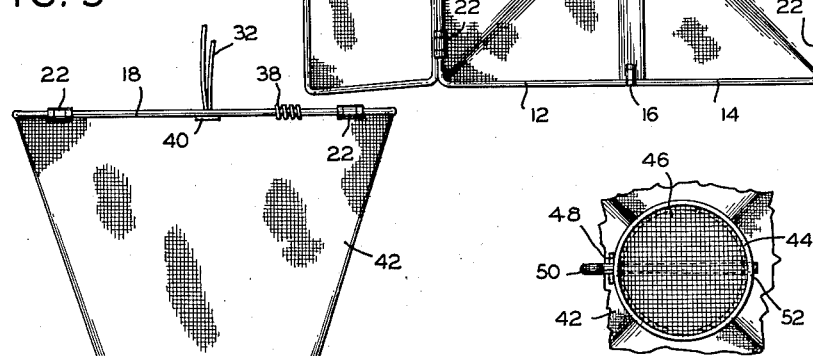
FIG. 4
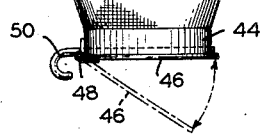
INVENTOR.
PHILIP PUGLIESE
BY
ATTORNEY

3,045,383
CATCH-ALL FISH NET
Philip Pugliese, 330 S. Regent St., Port Chester, N.Y.
Filed Mar. 20, 1961, Ser. No. 96,948
4 Claims. (Cl. 43—55)

This invention relates generally to fish nets, and more particularly to a fish net which may be opened and closed selectively at its top and bottom and thereby serves as a trap for fish that are caught as well as live bait such as minnows and which may be tied to a boat in the water with assurance that the bait or fish will not escape.

Fish nets and traps used for bait are already known which can be opened from their bottoms such as is disclosed in United States Patent No. 998,429. Nets which may be opened and closed along their tops are also known as disclosed in United States Patent No. 2,057,055. One of the few nets taught by the prior art wherein both the top and the bottom may be opened and closed selectively is disclosed in United States Patent No. 2,950,557. However, this latter net is not suitable for use in many instances during fishing due to the absence of a separate closure member which can be employed to prevent loss of live fish through the top of the net. In the net of the United States Patent No. 2,950,557 the closing of this net is accomplished by depending the upper periphery of the net from a support whereupon the upper portion of the netting itself on each side of the net folds together to thereby close the top. This tends to pin the fish in a position where the fish may be pulled out of the water with the rest of the net below the water and thereby lose the fish or bait.

The net comprising the present invention is an improvement over these and other prior nets obviating this loss of fish or live bait because of the provision of a rigid frame in the form of a closed loop which defines the periphery of the top or open mouth of the net. This frame has a pair of doors hinged thereto on opposing sides of the frame so that when folded down into abutment with the upper frame edges the top of the net is completely closed and is held in this position by spring means. Catches are provided on the frame which engage and retain the doors in their open position. In addition, a cord is provided which is connected to the free ends of the doors and threaded through an opening in the frame, whereby pulling on the cord will move the doors to their closed position.

For a fuller understanding of the nature and objects of the invention, reference should be had to the following detailed description taken in connection with the accompanying drawings, in which:

FIG. 1 is a perspective view of the fish net comprising the present invention;

FIG. 2 is a plan of the net with the doors shown in open position;

FIG. 3 is a side elevation of the net illustrating the open position of the bottom door in dotted lines, and FIG. 4 is a detail view of the bottom door structure including the retaining means therefor.

With more particular reference to the drawing, numeral 10 generally designates the rigid top frame member constructed of two U-shaped frames 12 and 14 pivotally connected together at 16 at the free ends of their legs so that the frame member can be folded for storage purposes.

A pair of doors 18 and 20 are connected by hinges 22 to the bight portions 24 of the U-shaped frames 12 and 14 so that doors 18 and 20 may be pivoted to rest on the upper edges of frame member 10 with the edges 26 of doors 18 and 20 substantially in abutment. Preferably doors 18 and 20 are constructed of metallic screen sections so as to be rigid or at least self-supporting.

A brace 28 is connected between pivotal connections 16 and extends parallel to bight portions 24. Brace 28 is provided with an opening 30 through which a loop of cord 32 is inserted. The free ends thereof are connected to edges 26 of doors 18 and 20 at 34 so that pulling on the loop formed in cord 32 will pull doors 18 and 20 toward each other. Springs 38 are connected between frame member 10 and doors 18 and 20 to constantly urge the latter toward closed position. Catches 40 are provided on the bight portions 24 of the frames to hold the doors in their open position as shown in FIG. 1. It should be noted that the catches are such as to permit doors 18 and 20 to be moved toward each other when a pulling force is exerted on cord 32. Springs 38 are not so strong as to overcome the action of catches 40 on doors 18 and 20, but will move the doors to closed position after a pull on cord 32 has released the doors from the catches.

The body of the net is formed by netting 42 connected along its upper edges to the periphery of frame member 10. Netting 42 narrows toward its lower end and is connected along its lower edges to a circular frame member 44 defining the open bottom of the net. A circular screen door 46 constructed of the same material as doors 18 and 20 is pivotally connected to frame 44 by a hinge 48. A bolt 50 slidably mounted to door 46 is retained in closed position. The door may be opened by sliding bolt 50 until it is withdrawn from opening 52. This door is shown in its open position in dotted lines in FIG. 3.

The operation and use of this net should be evident from the foregoing when considered in conjunction with the drawing. When the net is to be stored, frames 12 and 14 are moved toward each other about hinges 16 so that the net takes up relatively little space. In use, the net may be used as a bait box or as a container for fish which have already been caught. The doors 18 and 20 are pivoted to open position and after the fish have been deposited therein a pull on cord 32 will release the doors from catches 40 and springs 38 will move the doors to their closed position. The loop formed in cord 32 may be fastened to any secure support in a boat and the net permitted to fall into the water so that the fish will be kept alive and healthy. The springs 38 assure that doors 18 and 20 remain in closed position regardless of swirling currents in the water which may tend to open the doors. When it is desired to remove the fish from the net, the bottom door 46 may be opened in the manner described above and the fish contents poured into a suitable receptacle.

The frame member 10 together with the doors 18 and 20 connected thereto thus provide a unique structure in a fish net constructed of ordinary flexible netting 42 for its body portion while having its top portion formed of rigid members serving to retain the mouth of the net in open position but which may be closed by lowering the doors onto the frame. The hinges 16 are so constructed that metal frames 12 and 14 may only be pivoted toward each other in one direction so that when the frame member 10 is moved into its operative position from its storage position the metal frame members 12 and 14 will lie in a single plane.

Having thus disclosed the invention, what is claimed is:

1. A top and bottom opening fish net comprising a rigid top frame in the form of a closed loop, a reinforcing strip extending across said top frame, said reinforcing strip formed with an eye, two doors each connected to a side of said top frame with the inner edges of said doors being in abutting relation and overlying said strip with the doors in closed position, a cord connected to the free edge of each door passing through said eye to close said doors, netting connected to the periphery of said frame and depending therefrom to define a net having an open mouth, a second lower frame in loop form substantially smaller in size than said top frame connected to the lower end of said netting and bottom closure means for opening and closing said lower frame, said last named closure means including retaining means for releasably securing the bottom closure in closed position against said lower frame.

2. The net of claim 1, wherein said closure means comprises a bottom door movably connected to said second frame for opening and closing the bottom of said net.

3. The net of claim 1, wherein said rigid top frame includes a pair of U-shaped members pivotally connected together at the free ends of their legs, whereby the members may be pivoted toward each other so the rigid frame occupies a small amount of space for storage purposes.

4. The structure of claim 1, wherein said doors have a large number of small openings therethrough to readily permit water to flow therethrough.

References Cited in the file of this patent

UNITED STATES PATENTS

| | | |
|---|---|---|
| 1,262,507 | Johnston | Apr. 9, 1918 |
| 2,160,436 | Jones | May 30, 1939 |
| 2,584,643 | VanderChute | Feb. 5, 1952 |
| 2,950,557 | McDonald | Aug. 30, 1960 |
| 2,985,974 | Worcester | May 30, 1961 |